Patented Aug. 12, 1952

2,606,910

UNITED STATES PATENT OFFICE 2,606,910

DIELS-ALDER ADDUCTS OF HEXAHALO-CYCLOPENTADIENE

Simon H. Herzfeld, Rex E. Lidov, and Henry Bluestone, Chicago, Ill., assignors to Velsicol Corporation, Chicago, Ill., a corporation of Illinois No Drawing. Application January 5, 1946, Serial No. 639,416

18 Claims. (Cl. 260—342.4)

This application is a continuation-in-part of our co-pending application, Serial No. 581,172, filed March 5, 1945.

This invention relates to a new and unique class of halogenated organic compounds, hitherto unknown, and to methods for the preparation of said compounds.

The invention further relates to insecticidal and other preparations useful in agriculture, industry, and the arts, these preparations consisting of, or including as active ingredients, certain of the novel compounds of the invention.

The novelty and utility of our invention stems from our discovery that, contrary to all expectations and to all implications of the prior art, hexahalogenated cyclopentadiene will react as a generator in a Diels-Alder Diene Synthesis. Based on this discovery, we have been able to produce for the first time a wide variety of Diels-Alder reaction products of hexahalogenated cyclopentadiene with unsaturated organic compounds, many of these reaction products having properties which make them of great interest and value.

The Diels-Alder Diene Synthesis (or "Diene Synthesis," as the reaction is frequently more simply described), as herein referred to, consists of the 1,4 addition to a conjugated diene of an olefinic double or a triple bond. While the reaction is now well-established, its announcement is relatively recent. Accordingly, in order to avoid any possible confusion, the following terminology, frequently employed in the literature, will be used when convenient in the specification and claims: (1) The unsaturated compound participating in the reaction with a diene is called a dienophile; (2) the product of the reaction is called an adduct; and (3) the reactants, the diene and dienophile, are referred to jointly as the generators of the adduct, or simply as generators.

While the nature of the diene synthesis requires a conjugated dienic structure in one of the generators, many conjugated dienes do not appear to enter into this type of reaction. In fact, the scientific and technical literature on the subject indicates that there are numerous types of cases in which it is possible to predict with reasonable certainty that a conjugated diene will not react to yield diene synthesis products.

Thus, in general, the tendency of a conjugated diene to take part in the reaction diminishes as substitution increases on the terminal carbons of the dienic system. It is generally stated in the literature that halogen substituents in the diene are particularly effective hindering agents for this reaction; thus, while 2-chlorobutadiene and 2,3-dichlorobutadiene can be used in the synthesis, 1-chlorobutadiene and more highly chlorinated butadienes do not appear to undergo the reaction at all. This effect of halogen substitution is said to be general (c. f., Norton, "The Diels-Alder Diene Synthesis," Chem. Rev., 31, 379 (1942).

Cyclopentadiene reacts readily in the Diene Synthesis with a wide variety of unsaturated compounds.

It is entirely surprising and unexpected, however, that, as we have discovered, a completely halogenated cyclopentadiene, such as hexachlorocyclopentadiene or other hexahalocyclopentadienes can be made to react as one generator to give Diene Synthesis products, the reaction proceeding in some cases with great ease. The hexahalocyclopentadiene may include a single halogen, such as, for example, the hexachlorocyclopentadiene already mentioned, or hexabromocyclopentadiene; or, alternatively, the hexahalocyclopentadiene may include a mixture of halogens, such as, for example, tetrachlorodibromocyclopentadiene, bromopentachlorocyclopentadiene, etc. We have found that the hexahalocyclopentadiene generator may be made to react in the Diene Synthesis with a wide variety of types of unsaturated compounds, such as maleic anhydride, cyclopentadiene, butadiene, styrene, indene, dicyclopentadiene, phenylacetylene, fulvenes, etc.

These reactions are carried out simply, generally speaking, although, as will be noted in the examples given below and as might be anticipated, they do not proceed with equal facility in every case. Thus, in the reaction between hexachlorocyclopentadiene and cyclopentadiene, the reaction proceeds so vigorously when the reactants are brought together at room temperature that considerable cooling is required in order to avoid the loss of reactants from the reaction vessel at the elevated temperature which would otherwise be obtained by the self-generated heat of reaction. With indene the reaction is initiated at temperatures below 100 degrees centigrade. In other cases as, for example, with maleic anhydride it is necessary to raise the temperature of the reactants to above 100 degrees centigrade before the action is initiated. When a relatively elevated initiating temperature is required and one of the reactants is volatile it is of course advisable that the reaction be carried out in a sealed vessel capable of withstanding whatever pressures will be developed at the temperatures employed.

In those cases in which the reaction proceeds vigorously without the external application of heat, it may be helpful to carry out the reaction with the reactants dissolved in a solvent, the boiling of which will serve to control the reaction temperature. Hexane, heptane, ethyl, methyl alcohol, carbon tetrachloride, etc. have frequently been found useful for this purpose. Similarly, when external heat must be applied to cause the reaction to proceed at a convenient rate, the reaction may be carried out in a higher boiling solvent, the temperature being maintained at the boiling point of the solvent by means of suitable reflux apparatus. Xylene, cumene, etc. have been found suitable for this purpose in many cases.

When the unsaturated compound with which the hexahalocyclopentadiene is being reacted is itself capable of undergoing a polymerization reaction, it is frequently desirable, though not always necessary, that a polymerization inhibitor be included in the reaction mixture. Such a procedure is desirable, for example, with styrene and butadiene.

In general the optimum temperature at which the reaction is to be carried out will vary with the particular hexahalocyclopentadiene and the unsaturated compound with which it is being reacted. It is, therefore, not possible to specify definite upper and lower limits for the reaction. It may be generally stated, however, that the reaction temperature required will not be in excess of two hundred degrees centigrade.

The examples given below will illustrate the wide variety of unsaturated organic compounds which we have found possible to react in the Diene Synthesis with a hexahalocyclopentadiene as one generator. Both the particular products and the methods of preparation described are given for purposes of exemplification only, and our invention is not to be construed as being confined or limited to these examples.

EXAMPLE 1

We have found that hexachlorocyclopentadiene reacts rapidly with cyclopentadiene in the Diene Synthesis. As an example of a method of preparation of the 1:1 adduct, 64.5 parts by weight of hexachlorocyclopentadiene and 17.5 parts by weight of freshly distilled cyclopentadiene are mechanically stirred in a closed glass vessel equipped with an efficient reflux condenser and a thermometer. The progressively exothermic reaction is cooled when the reaction temperature reaches 100° C. The mixture is allowed to stand at room temperature until solidification is complete, and is then transferred to a suction funnel and dried by drawing air through it.

Analysis: Carbon 35.86%; hydrogen 1.98%; halogen 62.32%. Calculated for $C_{10}H_6Cl_6$: Carbon, 35.4%; hydrogen, 1.77%; halogen, 62.75%. The product is thus the expected adduct of hexachlorocyclopentadiene with cyclopentadiene in a molar ratio of 1:1.

The hexachlorocyclopentadiene employed in the above example may be prepared by any desired method. We have used satisfactorily the following procedure for preparing hexachlorocyclopentadiene of high purity: To 15 liters of approximately 2 molar sodium hypochlorite solution (cooled to about 10° C.), which is also approximately 0.5 molar with respect to excess sodium hydroxide, there is now added in one operation an emulsion of 376 grams (5.7 moles) freshly distilled cyclopentadiene in 400 ml. water containing 0.2% "Orvus" paste (50% technical sodium lauryl sulfate) vigorous mechanical stirring being maintained all the while. No external cooling is required to control the moderately exothermic reaction, the temperature of the reaction mixture reaching a peak of about 45° C. The reaction mixture consists of two phases, an aqueous phase and a non-aqueous phase. Adequate agitation is therefore required to provide intimate contact between the two phases; the agitation is continued for a total of two hours after the addition of the cyclopentadiene emulsion. After the stirring has been discontinued, the reaction mixture is allowed to stand long enough to effect a good separation of the aqueous and non-aqueous layers, after which the heavier non-aqueous layer (which contains the hexachlorocyclopentadiene) is drawn off and dried over magnesium sulfate. This crude liquid is purified by fractionation through an insulated 8 inch Hempel column packed with Berl saddles; hexachlorocyclopentadiene is collected at a boiling range of 58–64° C. at 1.3 to 1.5 mm. mercury.

Similarly, other hexahalogenated cyclopentadienes can be made to react as generators with cyclopentadiene in the Diene Synthesis, although generally not as readily as does hexachloropentadiene. In Example 2, for instance, the hexahalogenated cyclopentadiene used is hexabromocyclopentadiene.

EXAMPLE 2

To hexabromocyclopentadiene, melting at 86–87° C., contained in refluxing heptane solution is added portionwise over a 10-hour period an excess of cyclopentadiene. When the addition is complete the reaction mixture is steam distilled to remove solvent and any volatile impurities which may be present. The residue is recrystallized from methanol. The product thus obtained consists of large yellow crystals decomposing at 144–145° C.

Analysis: Carbon, 19.83%; hydrogen, 0.99%; halogen (as Cl), 35.13%. Calculated for $C_{10}H_6Br_6$—carbon 20.09%; hydrogen 1.13%; halogen (as Cl), 35.05%. The product is thus the expected adduct of hexabromocyclopentadiene with cyclopentadiene in a molar ratio of 1:1.

EXAMPLE 3

An interesting type of hexahalocyclopentadiene generator which may be used in preparing the products of our invention is a hexa-heterohalo cyclopentadiene, that is, one containing a mixture of halogens. We believe that we are the first to discover and prepare such mixed hexahalocyclopentadienes. One example of such compounds which we have employed as a generator in the Diene Synthesis is monochloropentabromocyclopentadiene.

A solution of 21.1 gms. (0.32 mole) of cyclopentadiene dissolved in 63 ml. of hexane is added, at one time, to a vigorously stirred mixed solution of sodium hypobromite and sodium hypochlorite maintained at 35° C. (the hypohalite solution consists of 0.64 mole of sodium hypobromite and 1.92 moles of sodium hypochlorite prepared from 2.0 molar solutions of each of the components; it contains an excess of alkali corresponding to 0.5 molar sodium hydroxide). The temperature after the addition of cyclopentadiene rises rapidly to 45° C. and is then maintained at 40–45° C. for one hour. At the end of this time agitation is discontinued and the heavy organic phase is separated, after the addition of approximately 1½ volumes (based on the non-aqueous phase) of hexane to insure good separation, from the aqueous phase. After decolorization of the separated organic phase with a decolorizing carbon the hexane is removed in vacuo. There results 106 gms. of crude chloropentabromocyclopentadiene.

To crude chloropentabromocyclopentadiene prepared as above is added a molar excess of cyclopentadiene and the mixture is heated under reflux at 60° C. for 2 hours. The resulting crude product is steam distilled to remove steam volatile impurities and the residue is recrystallized from methanol. Two recrystallizations yield a white crystalline solid melting at 140–150° C. with decomposition.

Analysis: Carbon, 20.7%; hydrogen, 1.07%; halogen (as Cl), 37.14%. Calculated for $C_{10}H_6ClBr_6$—carbon, 21.4%; hydrogen, 1.07%; halogen (as Cl), 38%. The compound is thus found to be the expected adduct of pentabromomonochlorocyclopentadiene with cyclopentadiene in a molar ratio of 1:1.

Among the wide variety of unsaturated organic compounds with which we have found that hexahalocyclopentadienes react in the Diene Synthesis are styrene, dicyclopentadiene, and other compounds containing the relatively unactivated isolated double bond. Examples 4, 5 and 6 describe typical reactions of this nature, in which the hexahalocyclopentadiene employed is hexachlorocyclopentadiene.

EXAMPLE 4

A mixture of 0.044 mole of styrene and 0.040 mole of hexachlorocyclopentadiene is heated in a sealed tube at 150° C. for 6 hours. The viscous oil reaction mixture resulting is triturated with a little methanol to separate unreacted material from the product which solidifies during the process. The resulting residue is recrystallized from fresh methanol. There is thus obtained a white crystalline solid, melting at 73–76° C.

Analysis: Carbon, 41.49%; hydrogen, 2.23%; molecular weight, 380. Calculated for $C_{13}H_8Cl_6$—carbon, 41.38%; hydrogen, 2.12%; molecular weight 377. The product is thus the expected adduct of hexachlorocyclopentadiene and styrene in a mole ratio of 1:1.

EXAMPLE 5

To 0.044 mole of hexachlorocyclopentadiene is added 0.049 mole of dicyclopentadiene and the mixture, contained in a sealed tube, is heated for 5 hours at a temperature between 140–165° C. There is thus obtained a viscous brown product. This material is steam distilled to remove unreacted dicyclopentadiene and the residue from this operation is twice recrystallized from acetone. The product is obtained as white crystals, melting at 152–5° C.

Analysis: Carbon, 44.45%; hydrogen, 299%; molecular weight, 434. Calculated for $C_{15}H_{12}Cl_6$—carbon, 44.44%; hydrogen, 2.96%; molecular weight, 405. The product is thus the expected adduct of hexachlorocyclopentadiene and dicyclopentadiene in molar ratio of 1:1.

EXAMPLE 6

A mixture of 0.02 mole of hexachlorocyclopentadiene and 0.01 mole of dicyclopentadiene is heated in an open vessel at 150–170° C. for 2½ hours. The almost solid reaction mixture resulting from this operation is recrystallized from hot benzene. A white crystalline solid, melting at 252–256° C. is obtained.

Analysis: Carbon, 35.37%, hydrogen, 1.84%, molecular weight 630. Calculated for -$C_{20}H_{12}Cl_{12}$—carbon, 35.39%; hydrogen, 1.77%; molecular weight 678. The product is thus the expected adduct of hexachlorocyclopentadiene and dicyclopentadiene in molar ratio of 2:1.

We have found also that a double bond of the type found in indene may also be reacted with a hexahalocyclopentadiene such as hexachlorocyclopentadiene. A preparation based on this reaction is described in Example 7.

EXAMPLE 7

A mixture of 0.01 mole of indene and 0.011 mole of hexachlorocyclopentadiene is heated in an open vessel for 1½ hours at approximately 95–100° C. At the end of this period of time the mildly exothermic reaction appears to be over and the reaction mixture is solid. The crude product is washed with methanol and the residue is recrystallized from an acetone-methanol solution. A white crystalline solid, melting at 152–6° C. is thus obtained.

Analysis: Carbon, 43.33%; hydrogen, 2.16%; chlorine, 54.79%; molecular weight, 381. Calculated for $C_{14}H_8Cl_6$—carbon, 43.19%; hydrogen, 2.06%; chlorine, 54.76%; molecular weight, 389. Thus the product is the expected adduct of hexachlorocyclopentadiene and indene in a molar ratio of 1:1.

With conjugated double bonds, hexachlorocyclopentadiene reacts readily, adding to one double bond at a time thus making it possible to obtain both mono- and di-adducts. In reactions of this sort, as has been mentioned previously, it is advantageous in some cases to introduce a polymerization inhibitor into the reaction mixture in order to avoid, as a side reaction, the undesired polymerization of the conjugated diene. Examples 8, 9 and 10 describe typical Diels-Alder reactions of conjugated dienes with a hexahalocyclopentadiene.

EXAMPLE 8

To 10 g. of hexachlorocyclopentadiene is added 7.5 g. (3 mole proportions) of isoprene (containing 0.6% of t-butylcatechol as a polymerization inhibitor) and the mixture, sealed in a bomb tube, is heated at 150° C. for 8½ hours. The resulting reaction product is distilled and the fraction boiling 135–6° C. at 5.5 mm. Hg is collected. This fraction is subsequently redistilled and the material boiling 134–5° C. at 5.5 mm. is separated as a slightly yellow viscous oil.

Analysis: Carbon, 35.75%; hydrogen, 2.32%; chlorine, 61.75%. Calculated for $C_{10}H_8Cl_6$—carbon, 35.23%; hydrogen, 2.37%; chlorine, 62.41%. The product is thus the expected adduct of hexachlorocyclopentadiene and isoprene in the molar ratio of 1:1.

EXAMPLE 9

To 5.2 gms. of hexachlorocyclopentadiene is added 4.3 gms. of liquid butadiene (and a few crystals of hydroquinone, to prevent polymerization of the latter material) and the reactants are sealed into a Pyrex bomb tube. Reaction between the two is obtained by heating the mixture at a temperature of 150° C. for a 36 hour period. The reaction product is a dark colored viscous liquid. This liquid was extracted with four 20 ml. portions of hot methanol. Evaporation of the methanol yields 2.6 gms. of an oily liquid.

Analysis: Carbon, 34.21%; hydrogen, 2.15%; molecular weight, 375. Calculated for $C_9H_6Cl_6$—carbon, 33.06%; hydrogen, 1.83%; molecular weight, 327. The material is thus the expected equimolar adduct of hexachlorocyclopentadiene and butadiene, possibly contaminated by a small amount of vinylocyclohexene.

EXAMPLE 10

To 5.5 gms. of distilled hexachlorocyclopentadiene is added 1.1 gms. of liquid butadiene and the reactants are sealed off in a Pyrex bomb tube. The two materials are reacted together by heating them at a temperature of 150° C. for four hours. The resulting reaction product is a dark crystalline solid which on recrystallization from isopropyl alcohol melts at 230–33° C.

Analysis: Carbon, 27.94; hydrogen, 1.11%; molecular weight, 589. Calculated for $C_{14}H_6Cl_{12}$—carbon, 28.00%; hydrogen, 1.00%; molecular weight, 600. The material is thus an adduct of 2 moles of hexachlorocyclopentadiene and 1 mole of butadiene.

Even acetylenic bonds may be reacted with a hexahalocyclopentadiene to yield Diels-Alder adducts. The reaction with phenyl acetylene is described in Example 11.

EXAMPLE 11

A solution containing 11 gms. of hexachlorocyclopentadiene, 5 gms. of phenyl acetylene and a few mg. of hydroquinone (to inhibit polymerization of phenyl acetylene) in 16 gms. of toluene is refluxed for 9½ hours. The solvent is then removed by vacuum distillation and the resulting oily residue is fractionated. The portion boiling 150–53° C. at 1.5 mg. Hg is collected.

Analysis: Chlorine 56.10%. Calculated for $C_{13}H_6Cl_6$—chlorine, 56.44%. The product is thus the expected adduct of hexachlorocyclopentadiene and phenyl acetylene in the molar ratio of 1:1.

An activated double bond such as is found in maleic anhydride reacts readily with the hexahalocyclopentadiene. An instance of a reaction of this sort is described in Example 12.

EXAMPLE 12

A mixture of equal molar amounts of hexachlorocyclopentadiene and maleic anhydride is reacted in refluxing xylene solution. After refluxing the reaction mixture for approximately 5 hours, part of the solvent is removed by distillation. The remaining solution is diluted with hexane. Following this step the product crystallizes from the solution and is isolated by separation on a filter. The white crystals thus obtained melt at 231–233° C.

Analysis: Carbon 30.55%; hydrogen 1.08%; neutral equivalent 181. Calculated for $C_9H_2Cl_6O_3$—carbon, 29.1%; hydrogen, .54%; neutral equivalent 185.5. The product is the expected maleic anhydride adduct of hexachlorocyclopentadiene.

The many new compounds which may now be prepared as a result of our discovery are so varied in nature as to have many applications in industry, agriculture, and the arts. Thus, for example, the adduct of hexachlorocyclopentadiene and maleic anhydride is a useful intermediate in the preparation of alkyd type resins possessing not only the desirable properties usually associated with resins of that type but also greatly increased fire resistance and the advantage of somewhat lower production costs.

Others of these products of our invention have usefulness as plasticizers in lacquer, varnish, plastic and similar formulations. Here, too, the fire resisting properties of these compounds are an advantage as is also their relatively low cost. Their high degree of solubility in most organic liquids insures compatibility in many types of compositions.

We have found that many of the compounds of our invention are insecticidally active. The insecticidal activity of the adduct of hexachlorocyclopentadiene and cyclopentadiene towards a variety of insects is relatively high. We have found this insecticidal property to be common to a number of hexahalocyclopentadiene adducts, though varying in degree with the specific adduct. The toxicity towards the common housefly of certain of these adducts is shown in the table below. The test procedure employed was the Peet-Grady large group method. Since an essential requirement of the Peet-Grady test is rapid knock-down, the Deobase (a commercial hydrocarbon base oil) solutions of our new toxicants were made to contain one per cent by volume of an organic thiocyanate (sold under the trade name "Lethane") knock-down agent. In the concentrations used, neither the Deobase nor knock-down agent had an appreciable effect on the percentage kill.

In the tests reported below all the insecticides of our invention tested were employed in the concentration of 1.0 per cent by weight in a solution of Deobase containing 1.0 per cent by volume of Lethane.

*Table*

| Insecticide | Percent Used | Percent Kill 24-Hour Count |
|---|---|---|
| 1. Control (Deobase with 1.0% Lethane) | | 5.7 |
| 2. Adduct of hexachlorocyclopentadiene and cyclopentadiene | 1.0 | 99 |
| 3. Adduct of hexabromocyclopentadiene and cyclopentadiene | 1.0 | 15 |
| 4. Adduct of hexachlorocyclopentadiene and styrene | 1.0 | 37 |
| 5. Adduct of hexachlorocyclopentadiene and butadiene | 1.0 | 31 |
| 6. Adduct of hexachlorocyclopentadiene and isoprene | 1.0 | 20.5 |
| 7. Adduct of monochloropentabromocyclopentadiene and cyclopentadiene | 1.0 | 16 |

It will be noted from the data in the above table that a concentration of only 1.0 per cent of our new insecticides listed showed marked potency, the potency in some cases being surprisingly great.

We have found also that the insecticidal compounds of our invention possess to a greater or less degree the property of "residual toxicity"—that is, they retain their insecticidal potency for a considerable length of time after being deposited on exposed solid surfaces. This property, which is possessed by relatively few insect toxicants, greatly increases the value of an insecticidally active compound for many types of application. The new insecticidal compounds of our invention may be utilized in the form of oil sprays, dusts, aqueous emulsions, aerosols, etc., either alone or in association with any other desired toxicants in preparations and by methods of application known to the art.

The examples of the compounds of our invention, and methods of preparing and utilizing them, which have been described in the foregoing specification have been given for purposes of illustration, not limitation. Other hexahalocyclopentadienes and other dienophiles may be employed as generators in the diene synthesis. Many other modifications and ramifications will naturally suggest themselves to those skilled in the art, based on the broad disclosure of our basic discovery; these are intended to be comprehended within the scope of our invention, as defined in the claims.

We claim as our invention:

1. The process of preparing the Diels-Alder adduct of a hexahalocyclopentadiene and a dienophile possessing a carbon to carbon unsaturated bond from the group consisting of maleic anhydride, cyclopentadiene, butadiene, styrene, indene, dicyclopentadiene, phenylacetylene, fulvene and isoprene which comprises reacting said materials at a temperature below 200° C.

2. A product formed in accordance with the process of claim 1.

3. The process of preparing the Diels-Alder adduct a hexachlorocyclopentadiene and a dienophile possessing a carbon to carbon unsaturated bond from the group consisting of maleic anhydride, cyclopentadiene, butadiene, styrene, indene, dicyclopentadiene, phenylacetylene, fulvene and isoprene which comprises reacting said materials at a temperature below 200° C.

4. The process of preparing the Diels-Alder adduct of a hexahalocyclopentadiene and cyclopentadiene which comprises reacting said materials at a temperature below 200° C.

5. A product formed in accordance with the process of claim 4.

6. The process of preparing the Diels-Alder adduct of a hexahalocyclopentadiene and butadiene which comprises reacting said materials at a temperature below 200° C.

7. The process of preparing the Diels-Alder adduct of a hexahalocyclopentadiene and maleic anhydride which comprises reacting said materials at a temperature below 200° C.

8. The process of preparing the Diels-Alder adduct of hexachlorocyclopentadiene and cyclopentadiene which comprises reacting said materials at a temperature below 200° C.

9. A product formed in accordance with the process of claim 8.

10. The process of preparing the Diels-Alder adduct of hexachlorocyclopentadiene and cyclopentadiene which comprises reacting said materials at a temperature below 200° C. in the presence of a solvent.

11. The process of preparing the Diels-Alder adduct of hexachlorocyclopentadiene and cyclopentadiene which comprises reacting said materials at a temperature below 200° C. in substantially equi-molar proportions.

12. The process of preparing the Diels-Alder adduct of hexachlorocyclopentadiene and butadiene which comprises reacting said materials at a temperature below 200° C.

13. A product formed in accordance with the process of claim 12.

14. The process of preparing the Diels-Alder adduct of hexachlorocyclopentadiene and maleic anhydride which comprises reacting said materials at a temperature below 200° C.

15. A product formed in accordance with the process of claim 14.

16. The process of preparing the Diels-Alder adduct of hexachlorocyclopentadiene and cyclopentadiene which comprises reacting said materials at a temperature below 100° C.

17. A product formed in accordance with the process of claim 16.

18. The Diels-Alder adduct formed by heating hexachlorocyclopentadiene and maleic anhydride in solution in a high boiling solvent.

SIMON H. HERZFELD.
REX E. LIDOV.
HENRY BLUESTONE.

REFERENCES CITED

The following references are of record in the file of this patent:

UNITED STATES PATENTS

| Number | Name | Date |
|---|---|---|
| 2,336,208 | Alder et al. | Dec. 7, 1943 |
| 2,352,606 | Alder et al. | July 4, 1944 |
| 2,382,038 | Bruson | Aug. 14, 1945 |

OTHER REFERENCES

Straus et al., Berichte der deutsche chemische Gesselschaft, vol. 63, pp. 1883–4 (1930).

Norton, Chemical Reviews, vol. 31, pp. 379–80 (1942).

Prill, Jour. Am. Chem. Soc., vol. 69, pp. 62–3 (1947).